US005749431A

United States Patent [19]
Peterson

[11] Patent Number: 5,749,431
[45] Date of Patent: May 12, 1998

[54] VEHICLE POWER STEERING SYSTEM

[75] Inventor: Terry Robert Peterson, Higley, Ariz.

[73] Assignee: General Motors Corporation, Detroit, Mich.

[21] Appl. No.: 656,958

[22] Filed: Jun. 6, 1996

[51] Int. Cl.$^6$ ............................................. B62D 5/06
[52] U.S. Cl. ........................................................ 180/422
[58] Field of Search ................................. 180/400, 417, 180/418, 419, 420, 421, 422, 423, 426, 427, 428, 429, 441, 442, 443

[56] References Cited

U.S. PATENT DOCUMENTS

| | | |
|---|---|---|
| 4,530,414 | 7/1985 | Fukino et al. ............................ 180/422 |
| 4,669,568 | 6/1987 | Kervagoret ............................... 180/422 |
| 4,771,846 | 9/1988 | Venable et al. .......................... 180/422 |
| 4,871,040 | 10/1989 | Zuraski et al. .......................... 180/142 |
| 5,070,956 | 12/1991 | Pawlak et al. .......................... 180/132 |
| 5,119,898 | 6/1992 | Eckhardt et al. ....................... 180/422 |

*Primary Examiner*—Stephen Avila
*Attorney, Agent, or Firm*—Anthony Luke Simon

[57] ABSTRACT

A vehicle power steering system comprising: an electronic controller; an electromagnetic mechanism controllably coupled to the microprocessor and mechanically coupled to the power steering system, wherein torque output from the electromagnetic mechanism is coupled to the power steering system; and a hydraulic assist unit including a controllable valve coupled to the controller, wherein the hydraulic assist unit provides assist torque responsive to the control of the controllable valve.

6 Claims, 5 Drawing Sheets

VEHICLE POWER STEERING SYSTEM

This invention relates to a vehicle power steering system.

BACKGROUND OF THE INVENTION

In an example variable assist power steering system, a hydraulic assist unit provides conventional steering assist torque and an electro-magnetic mechanism connected to the steering system provides variations in steering resist torque, for example, through the steering column. Such a system is shown in U.S. Pat. No. 4,871,040, assigned to the assignee of this invention. The electromagnetic mechanism provides a return to center torque that can be controllably increased, i.e., by applying a voltage of one polarity to the actuator, and that can be controllably decreased, i.e., by applying a voltage of the opposite polarity to the actuator. The driver feels, through the hand wheel or steering wheel effort, the torque that the actuator selectively adds to or subtracts from the steering system. A computer based controller controls the actuator in response to the driver's input and various vehicle parameters so that the vehicle operator feels a system response meeting a specific criteria set out by the system designer and programmed into the controller.

In another example variable assist power steering system, the conventional hydraulic assist system is replaced by a system in which flow of hydraulic fluid to the steering system hydraulic assist actuator is controlled by a computer based controller. This system also allows the system response that the vehicle operator feels to meet specific criteria set out by the system designer and programmed into the controller.

In general, to achieve the desired feel, the system provides the highest torque assist at the lowest vehicle speeds, for example, at parking lot speeds, because unassisted, that is where the driver would experience the most steering effort. Thus the hydraulic system must pump more fluid to the hydraulic assist actuator at low vehicles speeds. The required pump rate decreases at higher vehicle speeds.

SUMMARY OF THE PRESENT INVENTION

It is an object of this invention to provide a vehicle power steering system according to claim 1.

Advantageously, this invention provides a vehicle power steering system that varies assist torque under the control of a computer controller while reducing the amount of energy that the vehicle power steering system uses.

Advantageously, this invention provides a vehicle power steering system that incorporates structural elements of two individual types of previous variable assist power steering systems resulting in a system with high performance and increased efficiency.

Advantageously, this invention provides a combination of a computer controlled electric variable assist actuator and a computer controlled hydraulic variable assist mechanism into a single vehicle power steering system. The electric actuator and hydraulic mechanism share power assist functions in a manner that increases the overall efficiency of the power steering system thereby reducing the power steering system load on the vehicle power plant.

Advantageously, in one example, this invention provides a vehicle power steering system comprising a computer controller and an electro-magnetic actuator variable assist unit controllably connected to the computer controller and mechanically connected to the steering system to transfer electromechanical force thereto. A controllable variable flow hydraulic assist system is coupled to the computer controller and includes an actuator for transferring hydraulic assist to the steering system. Advantageously, the controller controls the electro-magnetic actuator motor to provide both assist and resist torque to the steering system and controls the hydraulic assist actuator to provide assist torque to the system. This invention allows the hydraulic pump to run at a substantially steady rate eliminating many variations in pump speed and decreasing the overall average pump load. The control of the electro-magnetic actuator accounts for variations in assist torque. The result is an overall increase in efficiency and reduced power loading on the vehicle engine.

BRIEF DESCRIPTION OF THE DRAWINGS

The present invention will now be described by way of example with reference to the following drawings in which.

DETAILED DESCRIPTION OF THE INVENTION

Figure 1:
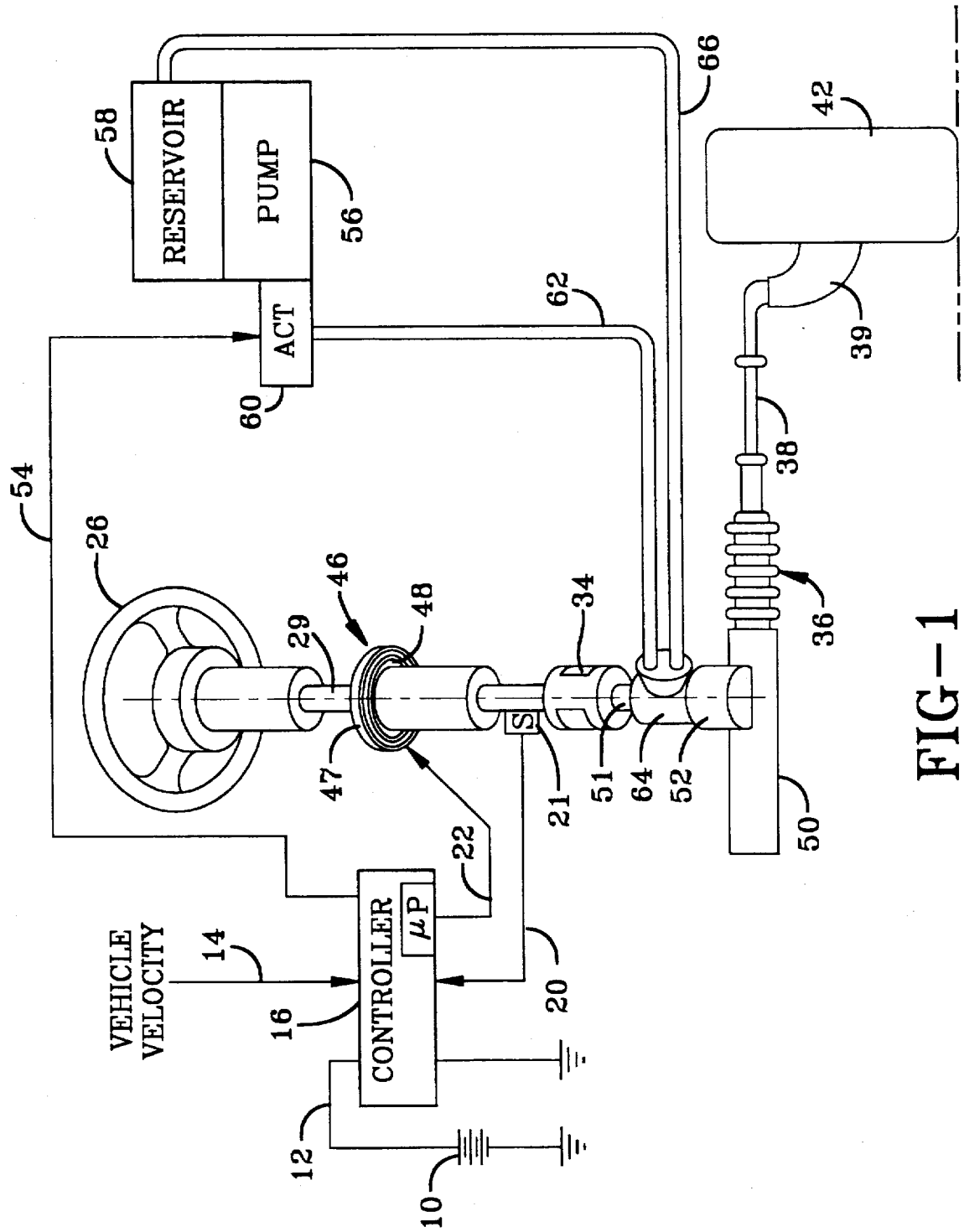
FIG. 1 illustrates a schematic of a vehicle power steering system according to this invention.

FIG. 1 illustrates schematically a motor vehicle power steering system according to this invention. The steering mechanism 36 is a rack-and-pinion type system and includes a toothed rack (not shown) and a pinion gear (also not shown) located under rack and gear housings 50 and 52. As a vehicle operator turns steering wheel 26, the steering shaft 29 turns and the lower steering shaft 51, connected to the upper steering shaft 29 through universal joint 34, turns the pinion gear. Rotation of the pinion gear moves the rack which moves tie rods 38 (only one shown), in turn moving the steering knuckles 39 (only one shown), which turn wheels 42 (only one shown).

Computer controller 16 controls hydraulic pump 56, hydraulic fluid reservoir 58, actuator 60, hydraulic lines 62 and 66 and hydraulic actuator 64 with microprocessor-based commands through command line 54 to provide variable hydraulic assist torque to the steering system. The hydraulic pump 56, reservoir 58, actuator 60, lines 62 and 66 and actuator 64 are all of a type known to those skilled in the art and in use on vehicles today.

In general, the vehicle engine (not shown) provides motive force to the pump 56. In response to control signals on line 54, actuator 60 selectively valves the pressurized fluid from the pump 56 to hydraulic line 62, selectively controlling the hydraulic assist torque provided by the system. Hydraulic line 62 is the hydraulic input to the hydraulic assist actuator 64, which provides hydraulic power assist to the steering system through the lower steering shaft 51. Hydraulic fluid output from the hydraulic assist actuator 64 returns to the reservoir 58 through hydraulic line 66.

The unit including electromagnetic mechanism 46 is generally of the type set forth in U.S. Pat. No. 4,871,040, assigned to the assignee of this invention, the disclosure of which is incorporated herein by reference, and operates to variably increase and decrease the driver felt steering system torque. Controller 16 controls the electromagnetic mechanism 46 through line 22 to either add assist torque or add torque load to the steering system.

In general the electromagnetic mechanism includes a rotary magnetic circuit and a stationary electromagnetic circuit. The rotary magnetic circuit comprises a pair of relatively rotatable elements (designated generally as reference 48), one of which is toothed to conduct magnetic flux and one of which includes permanent magnets for establishing a permanent magnet coupling. The stationary electromagnetic circuit comprises at least one annular exciting coil 47 disposed about the rotary magnetic circuit and ferromagnetic pole elements positioned adjacent the rotary magnetic pole pieces. The elements define two magnetic flux paths: a permanent magnetic flux path which includes only the rotary magnetic circuit elements and an electromagnetic flux path which includes both the stationary and rotary magnetic circuit elements. The unit operates as follows: when the assembly is in the centered position both flux paths are magnetically balanced, and when there is relative rotation of the input and output steering shafts, the flux in the two paths develop inphase centering forces which tend to restore the assembly to the centered position. The force due to the electromagnetic flux path is variable, it may be increased or decreased, over a wide range depending on the magnitude and direction of current supplied to the coil. Detailed description of the operation of mechanism 46 is well known to those skilled in the art and need not be set forth further herein.

In general, line 14 provides a vehicle speed signal to controller 16 and steering wheel position sensor 21 outputs a steering wheel or shaft position signal coupled to controller 16 through line 20. The controller also uses steering wheel speed information, which the controller may determine by integrating the steering wheel position signal on line 20 or which a separate steering wheel velocity sensor may provide to the controller. Those skilled in the art are well familiar with either implementation and well know appropriate steering wheel velocity sensors. The position sensor 21 may be an optical encoding type sensor, variable resistance type sensor or any other suitable type of position sensor well known to those skilled in the art.

In operation, as a vehicle operator drives the vehicle and turns the steering wheel, the controller 16 sensed the vehicle speed and steering wheel position and estimates steering wheel velocity. The controller then, in response to these inputs and computed signals, computes control commands for both electromagnetic mechanism 46 and the actuator 60. By controlling the flow of hydraulic fluid through actuator 60 to hydraulic line 62, the controller 16 indirectly controls the pump 56, which automatically turns on and off in response to fluid pressure in the reservoir 58. Controller 16 controls actuator 60 so that during virtually all normal driving conditions a relatively constant low flow of hydraulic fluid is provided to the hydraulic assist actuator 64 through line 62. Only under high steering wheel velocity or lateral acceleration maneuvers is the flow of hydraulic fluid to the actuator 64 increased.

Electromagnetic mechanism 46 provides the difference in torque assist between that provided by the constant flow rate to the actuator and that required by the vehicle driver, either countering the torque provided by variable assist actuator 64 or adding thereto. The result is that the flow rate of hydraulic fluid through actuator 64 can be maintained at a substantially constant flow rate averaging, in one example, 0.5–0.7 gallons per minute over the entire vehicle speed range. This contrasts to conventional control which provides flow rates radically varying from 1.35 to 2.35 gallons per minute in response to steering inputs and vehicle speed.

Implementation into a simulated system and study of power consumed indicates that the system according to this invention achieves an overall savings in power by consuming less energy output from the vehicle engine than conventional hydraulic assist systems.

Figure 2:
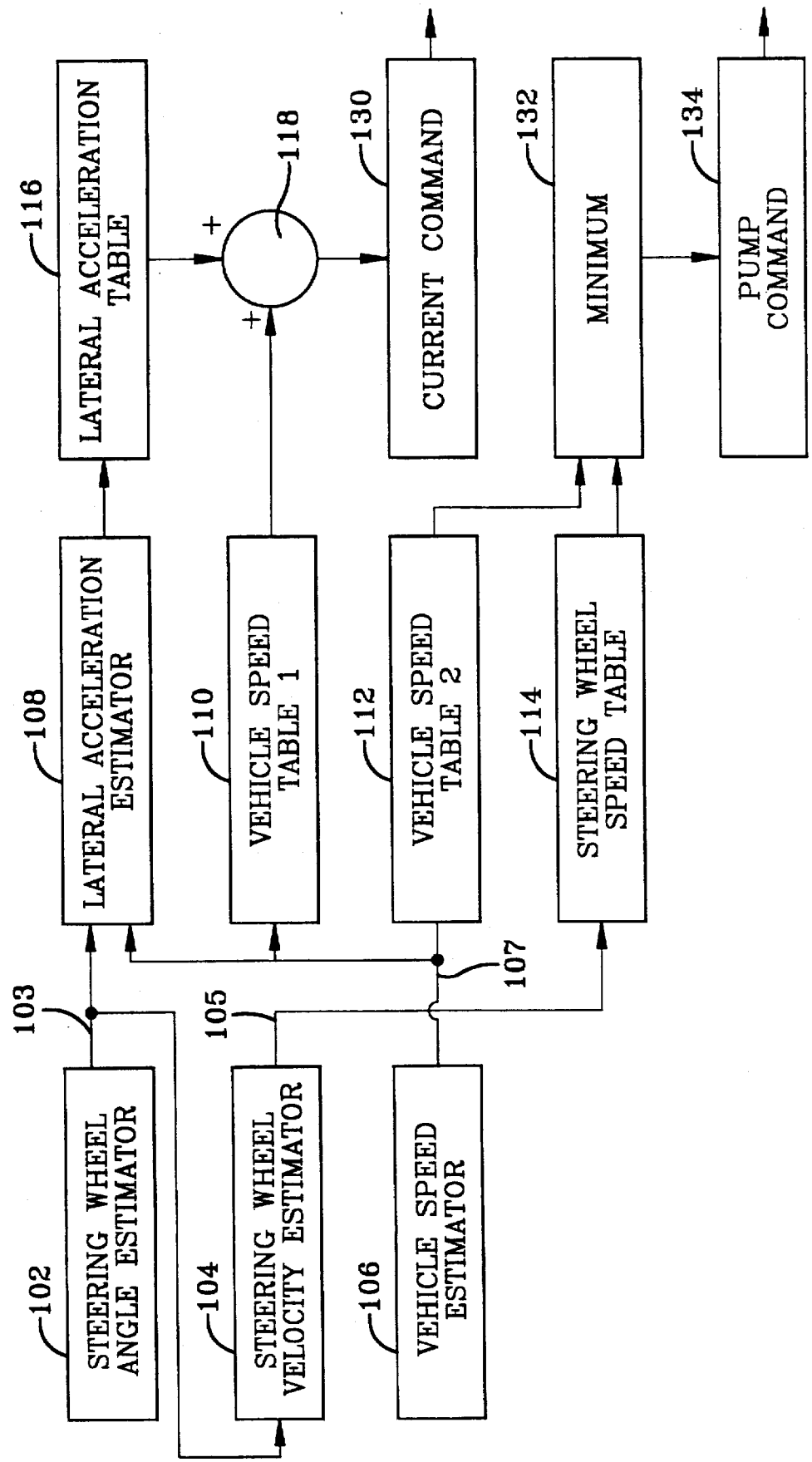
FIG. 2 illustrates a schematic of an example control of the vehicle power steering system according to this invention.

FIG. 2 illustrates the control that controller 16 performs in implementing this invention. Block 102 indicates that the controller 16 receives the signal from the steering wheel angle sensor 21 and converts that signal into a usable steering wheel angle or position signal on line 103. The controller utilizes the steering wheel angle signal on line 103 to computer steering wheel angular velocity at block 104, i.e., by differentiating the steering wheel angle signal.

Alternatively, a separate steering wheel velocity sensor of a known type provides a signal that block 104 and converts that signal to a usable steering wheel velocity signal on line 105.

Block 106 receives a conventional vehicle speed signal and converts it to an estimated vehicle speed signal on line 107 for use according to this invention.

In general, those skilled in the art well know the functions of blocks 102, 104 and 106 and such functions typically include low pass filtering and/or buffering functions of a known type to condition the input signals and eliminate the effects of signal fluctuations, as well as offset removal and scaling to convert the signals into the proper units of measure for use by the controller's microprocessor.

At block 108, the controller receives the steering wheel angle signal on line 103 and the vehicle speed signal on line 107 and estimates the lateral acceleration of the vehicle in a known manner. Known methods for computing lateral acceleration include using a three-dimensional look-up table or using a standard equation implemented to compute the lateral acceleration responsive to the vehicle speed signal, steering wheel angle signal and vehicle dimensional and steering characteristics.

The estimated lateral acceleration is then input into a control function look-up table 116, which responsively outputs a first component of the current command for the electromagnetic mechanism 46. The vehicle speed signal on line 107 is also provided to the first vehicle speed look-up table 110, which performs a separate control function providing as the output the second component of the current command for the electromagnetic mechanism 46.

Figure 3:
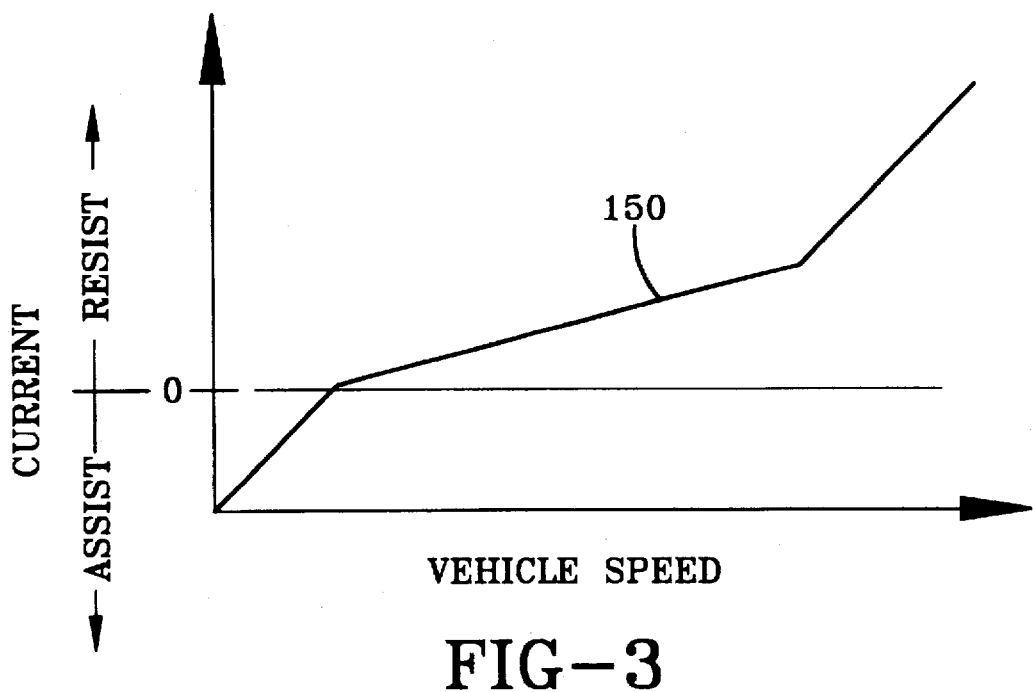
FIGS. 3–6 illustrate example control functions that the control according to this invention shown in FIG. 2 utilizes.
Figure 4:
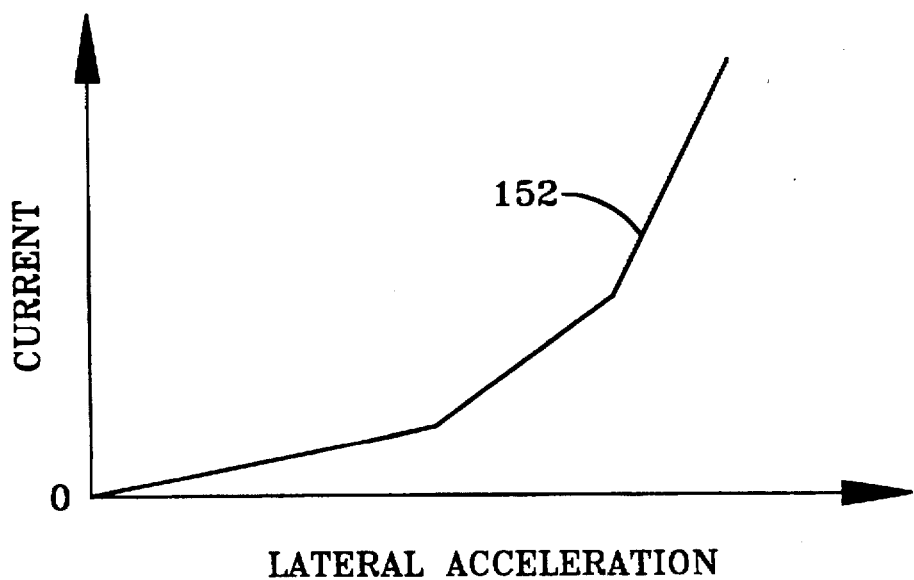

FIG. 3 illustrates an example control function implemented by the first vehicle speed table 110 and FIG. 4 illustrates an example control function implemented by the lateral acceleration table 116. In general, the lateral acceleration table increases current to the mechanism 46, transferring torque to the steering system to increase the steering torque felt by the operator as vehicle lateral acceleration increases. Trace 152 shows a typical implementation of this function.

The speed table shown in FIG. 3 indicates the assist and/or resist torque provided by the mechanism 46 as a function of vehicle speed. The electromagnetic mechanism 46 may be implemented to provide both resistance to operator input and assistance thereto and the zero current line divides the motor output 46 between resistance above the zero current line on the vertical axis and assistance below the zero current line on the vertical axis. Trace 150 shows an example of the function programmed into this table.

At block 118, the controller sums the two components of the mechanism current command and at block 130 the controller outputs the current command to the mechanism 46. Block 130 may implement any type of control function known to those skilled in the art, for example, a PID control, to control the mechanism 46 to achieve the desired and stable control.

Figure 5:
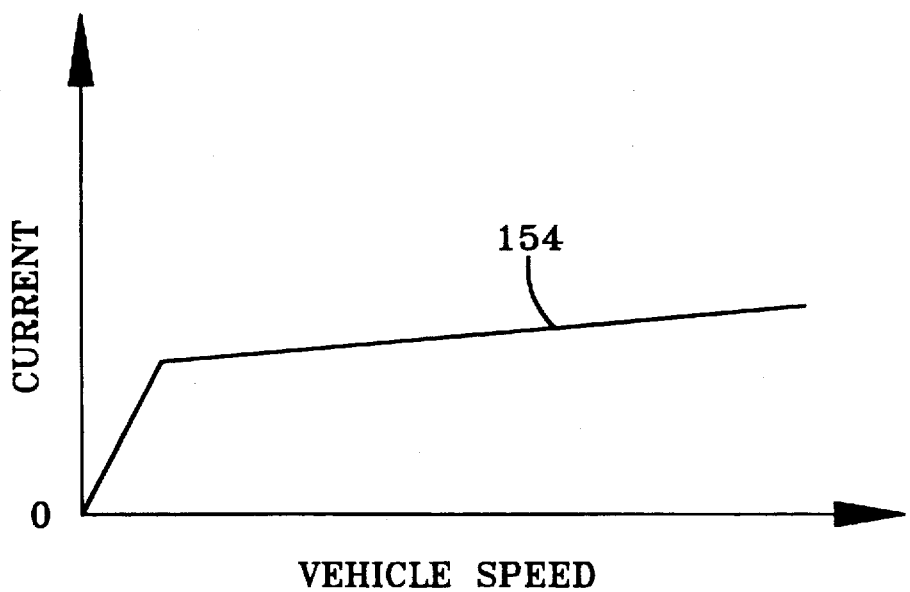

The vehicle speed signal on line 107 is also provided to block 112, which implements the second vehicle speed look-up table 110, providing a hydraulic assist command output according to the control function shown in FIG. 5. The trace 154 shown illustrates the example function implemented via the look-up table and, in general, provides a rather steady state output command.

Figure 6:
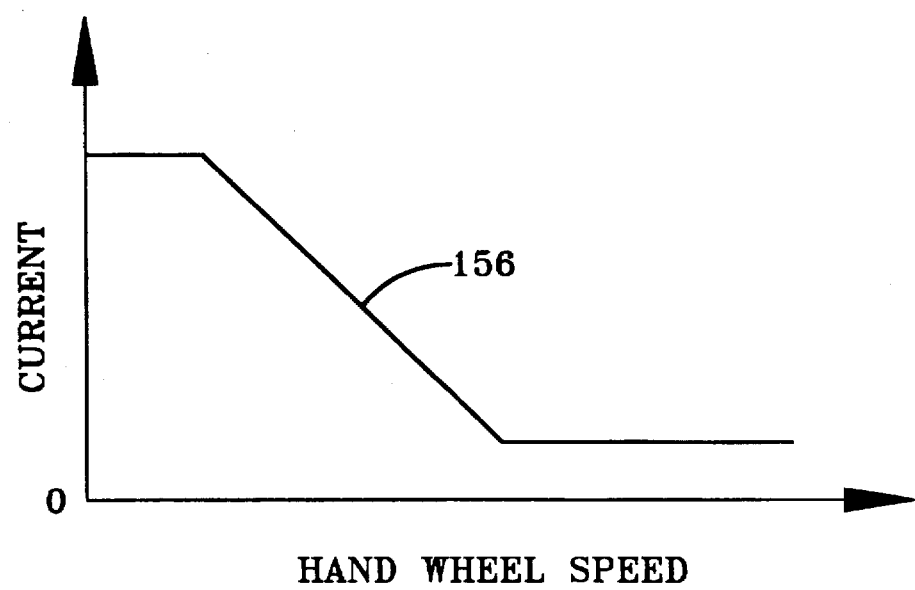

The steering wheel velocity signal on line 105 is provided to block 114, which implements a look-up table function to determine a hydraulic assist command responsive to the steering wheel velocity. An example of the function implemented by the table at block 114 is shown in FIG. 6 as trace 156 and is designed so that, under extreme steering maneuvers, it will revert back to a conventional control requiring higher hydraulic output from pump 56.

Block 132 receives both of the commands output from tables 112 and 114 and transfers the minimum of the two commands to the pump command block 134, which converts the command to a signal on line 54, which may be, for example, a PWM type signal for controlling actuator 60 to effect the desired pump flow rate. Those skilled in the art well know standard PWM control circuit implementations for use with actuator 60.

Figure 7:
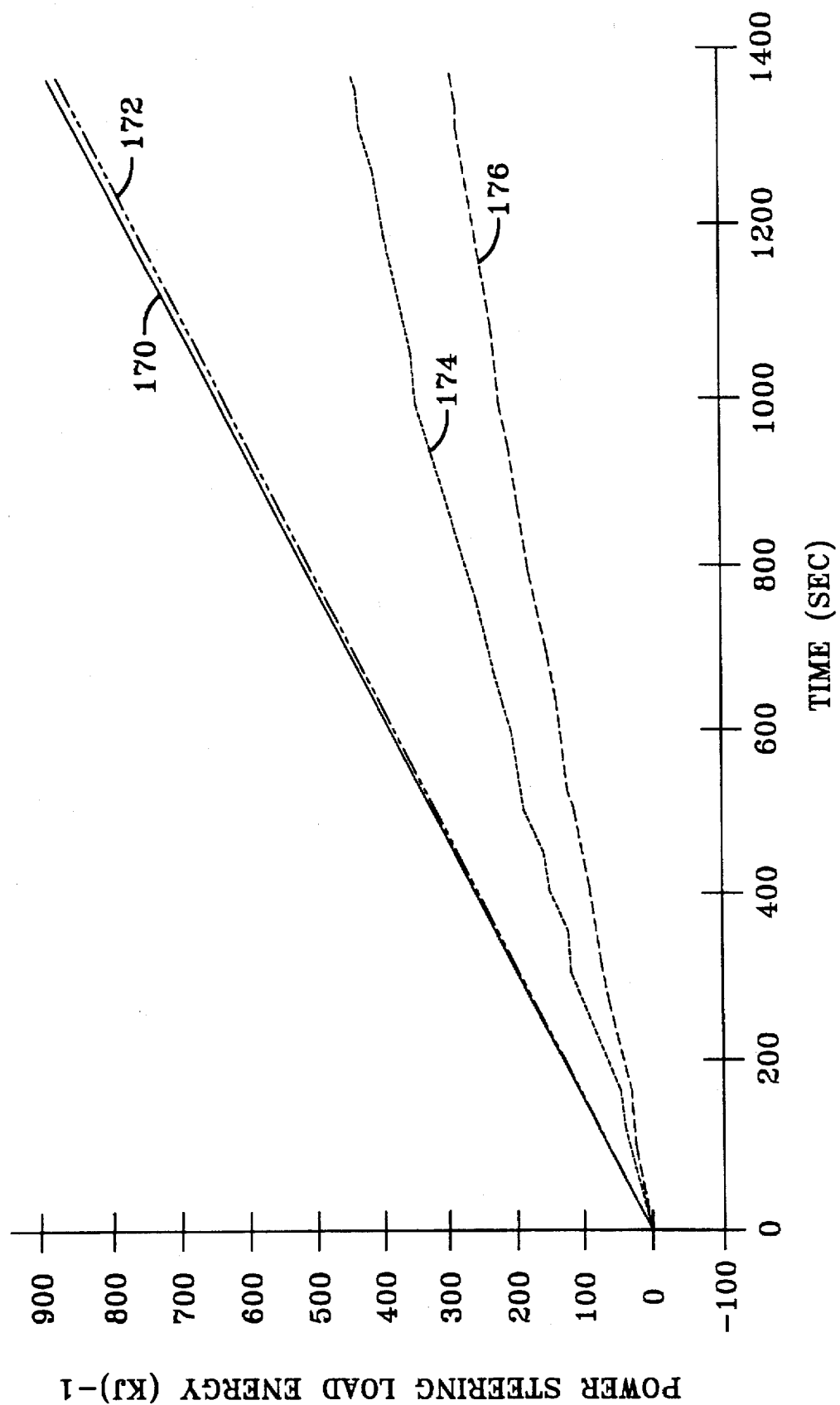
FIG. 7 illustrates example performance advantages achieved according to this invention.

Referring now to FIG. 7, the graph therein illustrates the results of the implementation of this invention into a simulated power steering system. Trace 172 illustrates, over a sample time period, the vehicle alternator load of a prior art computer controlled hydraulic assist system. Trace 174 illustrates the load on the engine caused by the hydraulic pump of the prior art computer controlled hydraulic assist system. Trace 170 illustrates the load on the alternator when the system according to this invention is implemented, showing a slightly higher level of electrical energy consumption than prior art trace 172. However, trace 176, showing the load on the engine caused by the hydraulic pump in the system according to this invention, illustrates a drastic decrease in the amount of energy consumed by the power steering system, more than offsetting the slight increase in alternator load. Summing the power consumed by the two systems, that is summing traces 172 and 174, the prior art computer controlled hydraulic assist system, and traces 170 and 176, the system according to this invention, illustrates an overall increase in efficiency by the system according to this invention, representing about a ten percent power savings by implementing this invention. In an example midsize car with a V-six engine, an increase in 0.14 miles per gallon is realized.

The benefits achieved by this invention can be further understood by considering example hydraulic pump loads of the system. In the typical control, the hydraulic pump load decreases as vehicle speed increases because the typical system design requires less assist torque as vehicle speed increases. In an example prior art computer-controlled hydraulic assist system, a hydraulic fluid pump flow rate as low as 0.5 gallons per minute is not achieved until the vehicle speed is up to about 50 miles per hour. According to this invention, using the same hydraulic pump, actuator and valve, the hydraulic pump flow rate is reduced to 0.5 gallons per minute by the time the vehicle speed is up to 20 miles per hour. In the prior art system, the average pump flow rate at 20 miles per hour was 2.1 gallons per minute and the flow rate of 0.5 gallons per minute was not reached until the vehicle speed reached approximately 50 miles per hour.

I claim:

1. A vehicle power steering system comprising:

an electronic controller generating first and second control commands;

an electromagnetic mechanism including rotary and stationary magnetic circuits controllably coupled to the electronic controller and mechanically coupled to the power steering system, wherein a torque output of the electromagnetic mechanism varies in response to the first control command from the electronic controller, wherein the torque output from the electromagnetic mechanism is mechanically transferred to the power steering system to provide at least one of assist and resist torque to the power steering system; and a hydraulic assist unit including a controllable valve controllably coupled to the electronic controller and responsive to the second control command therefrom, wherein the hydraulic assist unit is mounted to provide assist torque to the power steering system, wherein the hydraulic assist unit provides the assist torque responsive to the control of the controllable valve by the electronic controller.

2. A vehicle steering system according to claim 1, wherein the hydraulic assist unit includes a pump with an average fluid flow rate of under 1 gallon per minute over an entire operating speed range of the vehicle.

3. A vehicle steering system according to claim 1, wherein the second control command controls the hydraulic assist unit to a substantially constant flow output.

4. A vehicle steering system according to claim 1, wherein the electromagnetic mechanism provides variations in assist torque to the power steering system.

5. A vehicle steering system according to claim 1, wherein the electromagnetic mechanism provides assist and resist torque to the steering system.

6. A vehicle steering system comprising:

an electronic controller;

an electromagnetic mechanism including rotary and stationary magnetic circuits controllably coupled to the electronic controller and mechanically coupled to the power steering system, wherein torque output from the electromagnetic mechanism is coupled to the power steering system; and a hydraulic assist unit including a controllable valve controllably coupled to the electronic controller, wherein the hydraulic assist unit is mounted to provide assist torque to the power steering system, wherein the hydraulic assist unit provides the assist torque responsive to the control of the controllable valve, wherein the hydraulic assist unit includes a pump with an average fluid flow rate of approximately 0.5–0.7 gallons per minute over an entire operating speed range of the vehicle.

* * * * *